United States Patent [19]

Jönsson

[11] Patent Number: 4,717,820

[45] Date of Patent: Jan. 5, 1988

[54] DEVICE FOR DETECTING MOVABLE OBJECTS

[76] Inventor: Bert O. Jönsson, Rödbenavåg. 6, 23044 Vintrie, Sweden

[21] Appl. No.: 827,935

[22] PCT Filed: Apr. 2, 1985

[86] PCT No.: PCT/SE85/00154

§ 371 Date: Jan. 9, 1986

§ 102(e) Date: Jan. 9, 1986

[87] PCT Pub. No.: WO85/04728

PCT Pub. Date: Oct. 24, 1985

[30] Foreign Application Priority Data

Apr. 5, 1984 [SE] Sweden ............................. 8401910

[51] Int. Cl.⁴ ............................................. H01J 40/14
[52] U.S. Cl. .................................... 250/209; 250/221; 250/210; 340/555
[58] Field of Search .................. 250/209, 210, 221; 340/555-557

[56] References Cited

U.S. PATENT DOCUMENTS 3,191,048  6/1965  Cowen .................................. 250/221
3,793,523  2/1974  Desvignes et al. ................. 250/209
3,803,572  4/1974  Campman ............................ 250/221

Primary Examiner—Edward P. Westin
Attorney, Agent, or Firm—Brooks & Kushman

[57] ABSTRACT

A device for detecting movable objects within a limited detection area comprises a number of juxtaposed photosemiconductors (A, B) on which an image of the detection area is adapted to impinge and which are uniformly distributed on branches (10, 11) of an electric bridge circuit, such that two juxtaposed photoresistors (A and B, respectively) are included in separate bridge branches (10 and 11, respectively). The bridge branches (10, 11) are connected to a rectifier (13) for generating an output signal.

1 Claim, 3 Drawing Figures

DEVICE FOR DETECTING MOVABLE OBJECTS

BACKGROUND OF THE INVENTION

The present invention relates to a device for detecting movable objects within a limited detection area.

DESCRIPTION OF THE PRIOR ART

In connection with, for example, automatically operated doors and burglar alarms, there is a demand for a device for detecting movable objects, primarily human beings, but also e.g. shopping trolleys in department stores and beds in hospitals. Several such devices are already in existence today, and the effect of these devices is based on ultrasonics, microwave technique, optoelectronics. The ultrasonic detectors may be based on the Doppler effect or on echo recordings. The microwave technique is usually based on the Doppler effect. The group of optoelectronic detectors comprises, for example, photocell systems of the reflecting and refractive type and video cameras.

It is an object of the present invention to provide a device operating with visible light for detecting movable objects, said device being intended to provide identical detection of varying objects, warm as well as cold. The device should be indifferent to environmental variations, apart from movements, for example acoustic/optical variations, and provide for simple signal processing and also determination of the speed of the detected object. A further object of the invention is to provide such a device of this type as is capable of determining the direction of movement of the detected object.

DESCRIPTION OF THE INVENTION

The present invention relates to a new and improved optical device operating with visible light and adapted to detect movable objects within a limited detection area. The device comprises an arrangement of a number of juxtaposed photosemiconductors uniformly distributed on two bridge branches in an electric bridge circuit, such that two adjacent photosemiconductors are included in separate bridge branches. If the photosemiconductor arrangement receives an image of the detection area, the bridge is largely in balance, independently of the intensity of the surrounding light and the reflectivity of stationary surfaces within the detection area. If an object is moving across the area, its image will be projected on the photosemiconductors alternately in one and the other bridge branch. In this manner, the bridge will provide a low-frequency alternating voltage, regardless of whether the object is darker or lighter in relation to its surroundings or background. By full-wave rectification, there is obtained a unipolar output signal of double frequency, the magnitude of which is proportional to the speed of the object within the detection area.

If there are arranged, for detecting movable objects within a limited detection area, several devices of the above-mentioned type, with mutually different orientations of their semiconductor arrangements, the output signals of the devices will provide, in combination, information about the direction of movement of a detected object within the detection area. Such a multi-device arrangement may be used to advantage in, for example, the application of the basic idea of this invention to automatic door operation, such that the door is operated, for example opened, only if the movement of the object has one or more predetermined directions, for example towards the door.

The image of the limited detection area must not be thrown or projected directly onto the photosemiconductors, but individual picture elements of the area may be conducted to the photosemiconductors by means of light guides, such as fiber optical light guides. Examples of photosemiconductors suitable for the purpose of this invention are photodiodes, phototransistors and photoresistors.

BRIEF DESCRIPTION OF THE DRAWINGS

The invention will be described in more detail below, reference being had to an embodiment chosen by way of example and illustrated in the accompanying drawing in which.

EMBODIMENT CHOSEN BY WAY OF EXAMPLE

Figure 1:
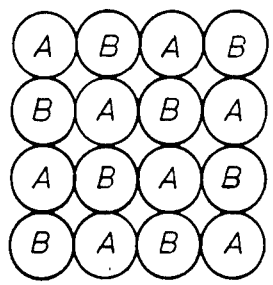
FIG. 1 shows an arrangement of photoresistors in the device.
Figure 2:
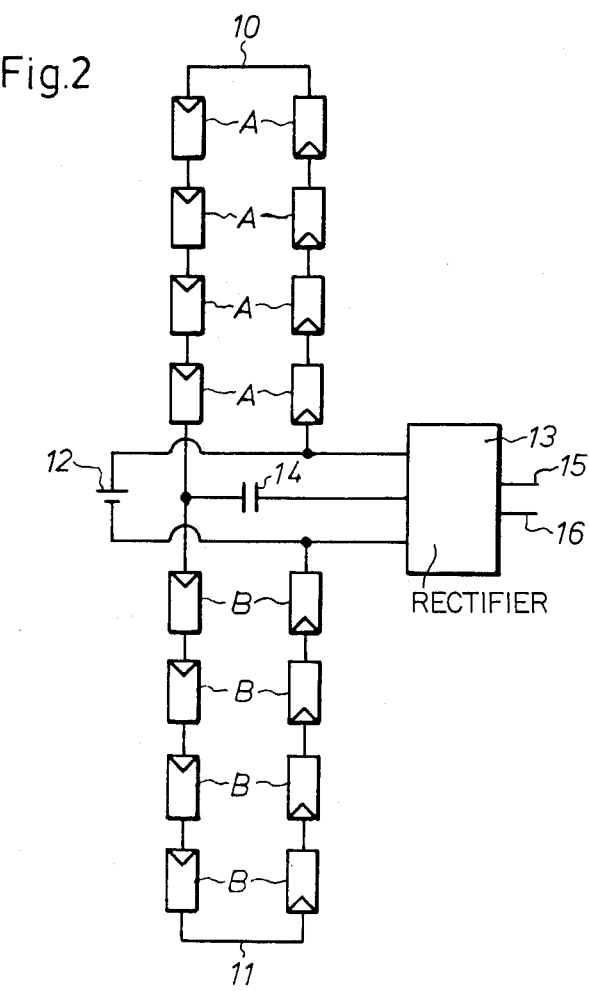
FIG. 2 shows a circuit diagram of the device.

As will appear from the drawings, the device according to the invention and chosen by way of Example comprises eight photoresistors A and eight photoresistors B uniformly distributed on two bridge branches 10, 11 in such a manner that two juxtaposed photoresistors A and B, respectively, are included in separate bridge branches. The outer ends of the bridge branches are connected to a direct voltage source 12 and to a rectifier unit 13. The common centre of two bridge branches is connected, via a capacitor 14 to the rectifier unit 13 which has two signal outputs 15, 16. If an object is moving across the detection area, the image of the object will be sensed by photoresistors alternately in one and the other bridge branch, such that the bridge will provide a low-frequency alternating voltage regardless of whether the object is darker or lighter than its background. The rectification in the rectifier unit 13 provides a unipolar output signal across the output 15, 16, and this signal is given the double frequency if the unit 13 provides full-wave rectification.

Figure 3:
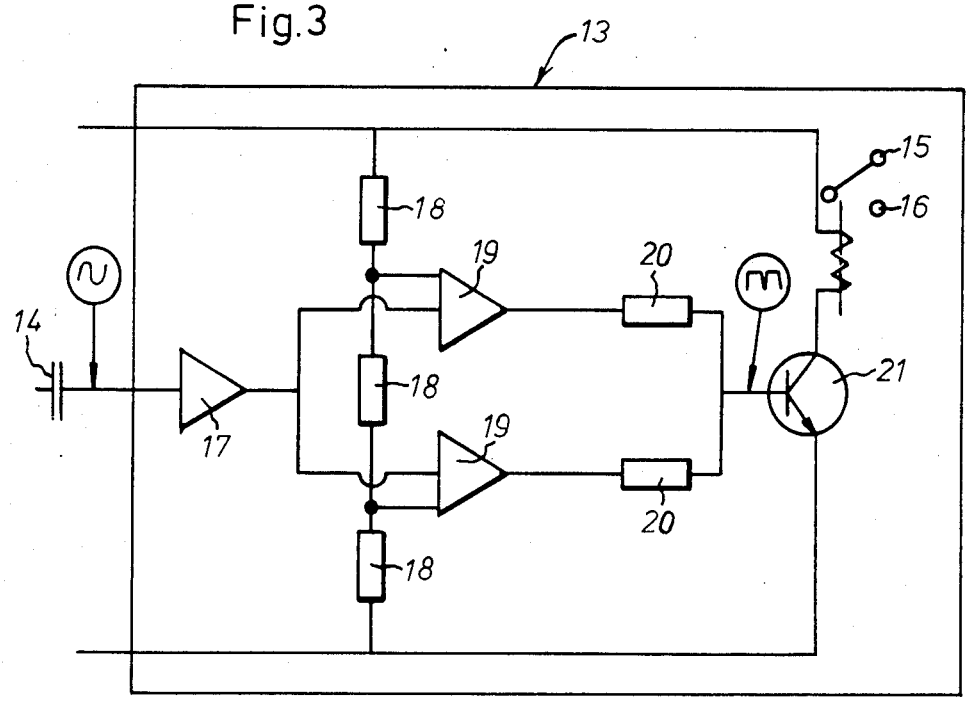
FIG. 3 shows a circuit diagram of a rectifier comprised by the device.

Such a rectifier unit 13 may comprise, as shown in FIG. 3, an amplifier 17 for the output signal from the capacitor 14 and a voltage divider with three resistors 18 supplying two reference voltages which, together with the output signal from the amplifier 17, are applied to two comparators 19. Two addition resistors 20 combine the voltages which have been rectified by the comparators and which constitute a control signal to an effect transistor 21 capable of actuating a relay having contacts 15 and 16 for, for example, activation of a door opening mechanism.

An image of the area to be monitored may be applied or projected onto the photosemiconductor arrangement by means of an optical system, for example a lens system, directly or indirectly, via light guides.

I claim:

1. A device for detecting movable objects within a limited detection area, characterized in that the device comprises a number of photosemiconductors (A, B) each of the photosemiconductors being located adjacent at least two other photosemiconductors to define a detector surface and on which an image of the detection are is adapted to impinge and which are uniformly distributed on branches (10, 11) of an electric bridge circuit, such that two adjacent photosemiconductors (A and B, respectively) are included in separate bridge branches (10 and 11, respectively), and that the photosemiconductor bridge branches (10, 11) are connected to a rectifier (13) for generating an output signal.

* * * * *